United States Patent

[11] 3,553,378

[72] Inventors Soloman Alter
Hartsdale;
John A. Goodfellow, Yonkers; Robert F. Kane, New York, N.Y.
[21] Appl. No. 726,733
[22] Filed May 6, 1968
[45] Patented Jan. 5, 1971
[73] Assignee Dialscan Systems, Inc.
New York, N.Y.
a corporation of New York

[54] INFORMATION RETRIEVAL APPARATUS VIA TELEPHONE LINES PROVIDING SIMULTANEOUS ACCESSING OF SAME INFORMATION SOURCE
19 Claims, 8 Drawing Figs.

[52] U.S. Cl. ........ 179/6, 179/2
[51] Int. Cl. ........ H04m 1/64, H04m 11/08
[50] Field of Search ........ 179/6CO, 6R, 2R,DP; 340/152

[56] References Cited
UNITED STATES PATENTS

| | | | |
|---|---|---|---|
| 1,337,197 | 4/1920 | Clausen | 179/6 |
| 2,092,493 | 9/1937 | Allen et al. | 179/6 |
| 2,993,960 | 7/1961 | Anderson | 179/6X |
| 3,199,226 | 8/1965 | Joslow | 179/6X |
| 3,347,989 | 10/1967 | Riddell | 179/6 |
| 3,352,973 | 11/1967 | Bodenstein | 179/6 |

*Primary Examiner*—Bernard Konick
*Assistant Examiner*—Raymond F. Cardillo, Jr.
*Attorney*—Jack Oisher

ABSTRACT: Information retrieval apparatus providing selective access by subscribers through telephone lines to a plurality of program sources is described. Common control equipment including a marker is employed for connecting each subscriber to a program matrix. All subscribers may access the same program nearly simultaneously. Crossbar switches are used for the marker in the common control equipment and for the program matrix.

Figure 1:
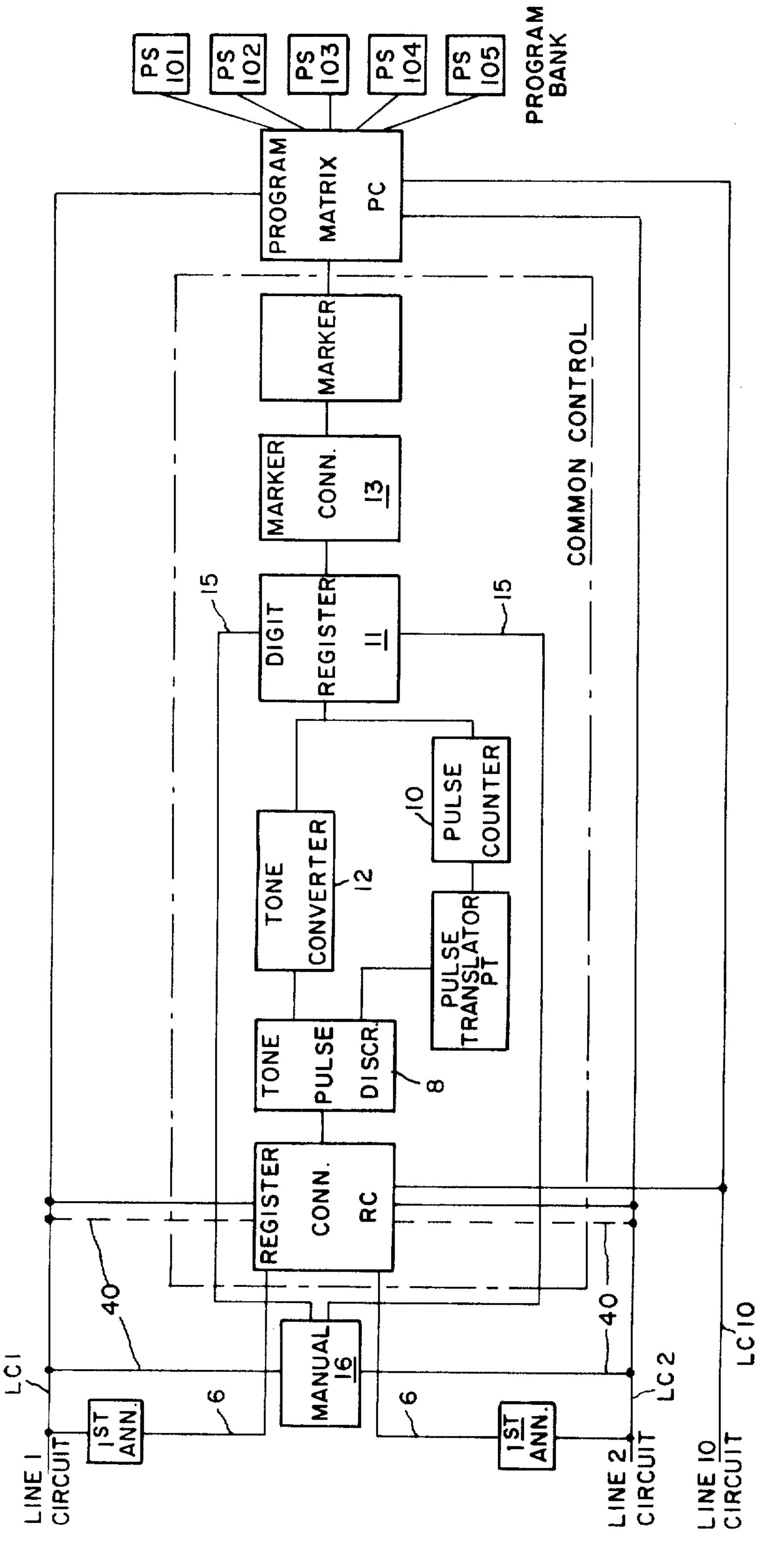

INFORMATION RETRIEVAL APPARATUS VIA TELEPHONE LINES PROVIDING SIMULTANEOUS ACCESSING OF SAME INFORMATION SOURCE

This invention relates to information retrieval apparatus, and in particular to apparatus comprising a bank or library of information accessible automatically or semiautomatically, via telephone lines or other means, to a plurality of subscribers on demand quickly, efficiently, and inexpensively.

A typical application for such apparatus is in the airline information field. Airline companies are frequently deluged with calls via public telephone lines requesting information on departure or arrival times of certain flights. The traffic pattern shows a concentration of information requests directed to particular flight numbers close to their scheduled departure and arrival times. The information supplied by manual operators is always the same indicating, for example, ontime or delayed departure or arrival times, yet to provide adequate customer service requires a large number of live operators as well as a large number of telephone lines because of the time required to process each call on an individual and live basis. The information which is relatively stable and changes infrequently is easily recorded on magnetic tapes, but the problem posed is how to make available automatically or semiautomatically, the information recorded on one or more of, for instance, hundreds or thousands of tapes to one or more callers on a plurality of incoming telephone lines. The problem is especially acute when it is recognized that the information on the same tape must be accessible to all the callers rapidly, to avoid tying up of the lines, using apparatus that is not prohibitively expensive.

A general object of the invention is relatively inexpensive information retrieval apparatus making available to a plurality of subscribers recorded information.

A further general object of the invention is to provide relatively inexpensive apparatus affording automatic or semiautomatic rapid access by one or more central office dial pulse or tone signalling subscribers to the same or different recorded information.

A further general object of the invention is information retrieval apparatus making available up to as many as thousands of recorded pieces of information or message units to one or more subscribers via public telephone lines, which apparatus is designed in a modular form enabling easy multiplication to increase the number of recorded message units or increase the number of subscribers serviced as required.

In accordance with the invention, all of the incoming lines serviced by the apparatus are terminated automatically or manually by an operator on a switching system. All of the recorders of the information to be conveyed to the subscribers are also terminated on the switching system. A common control system in response to dial signal pulses or signal tones coded to the recorders and generated by the subscriber on the connected line or manually by an operator automatically interconnects the caller line with the desired recorder, and then drops out and thus becomes available for subsequent calls. The recorder delivers the wanted information and then automatically terminates the call. The switching system allows any caller to be connected to any recorder, and all callers to the same recorder even while being accessed by other callers.

The invention contemplates both automatic and semiautomatic (with manual operator) systems. A feature of the invention in the automatic apparatus is that the subscriber himself establishes the proper connection by online or secondary dialing after his call has been acknowledged and an indication has been supplied to him that the common control is idle and available for use. The apparatus responds to both tones from a tone signal generator and the more conventional dial pulses. For the latter case, a novel circuit is included to restore a normal (before connection) pulse shape and to provide discrimination against noise.

A feature of the invention in the semiautomatic apparatus is that it can readily be added to an existing board facility reducing significantly the number of live operators required to handle the traffic and reducing the time during which the incoming lines are tied up.

A further feature of the invention applicable to both the automatic and semiautomatic apparatus is the inclusion of a crossbar switch as a marker for selecting the recording desired, the marker crossbar operating in response to a register for registering the coded dial pulses or tones. Still another feature is the inclusion of another crossbar switch to serve as a switching matrix to which each incoming line and each recorder is terminated, the marker determining which horizontal channel and which vertical strip of the closed crosspoint contact sets are activated and thus determining the particular recorder to be connected to the caller. Still a further feature is the provision of auxiliary relays associated with each vertical unit of the crossbar matrix enabling commercially available crossbar switches with 10 horizontals and 20 verticals to be connected to provide access by 20 incoming lines to 60 different recorders.

Figure 2:
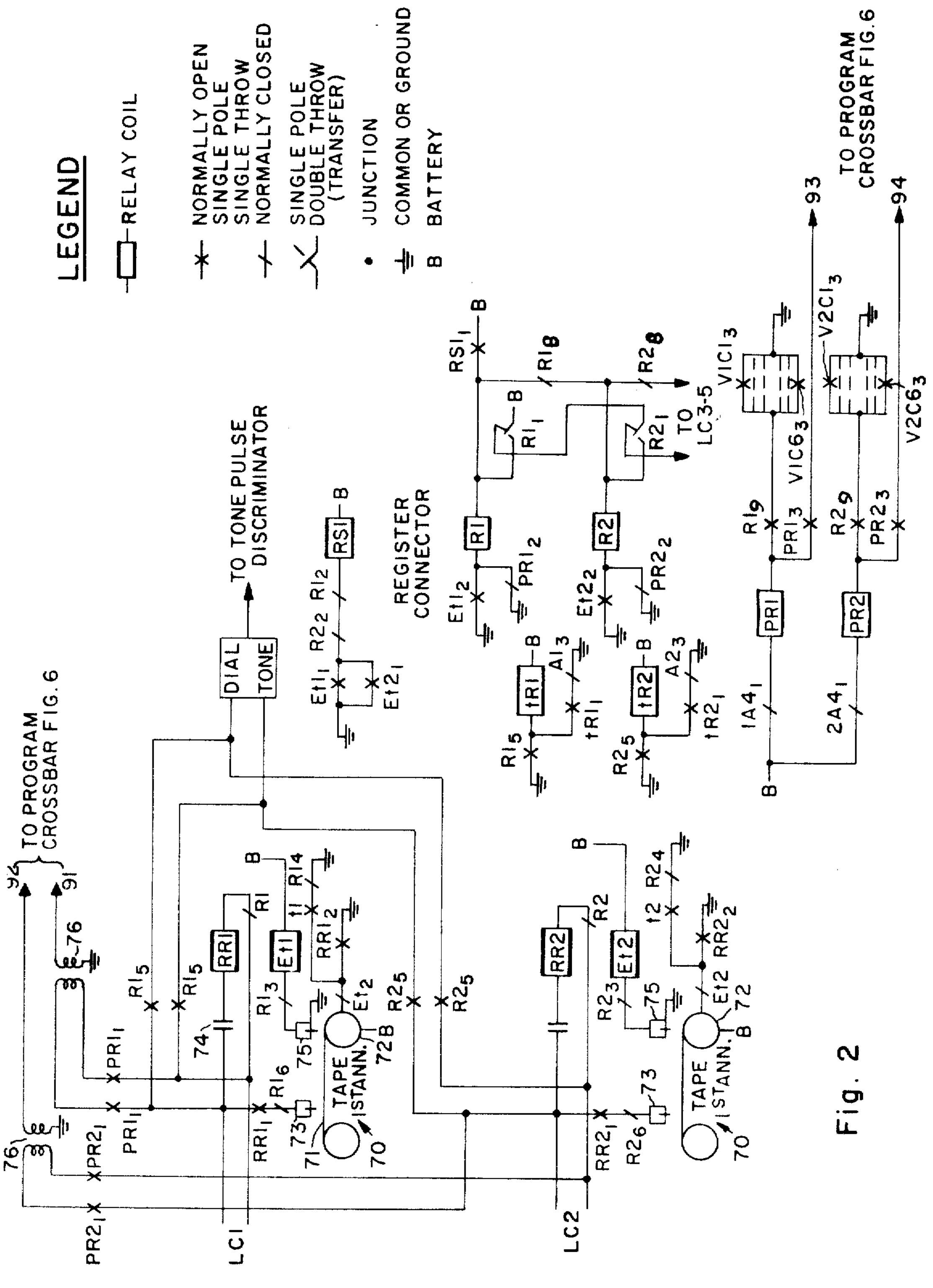
Figure 3:
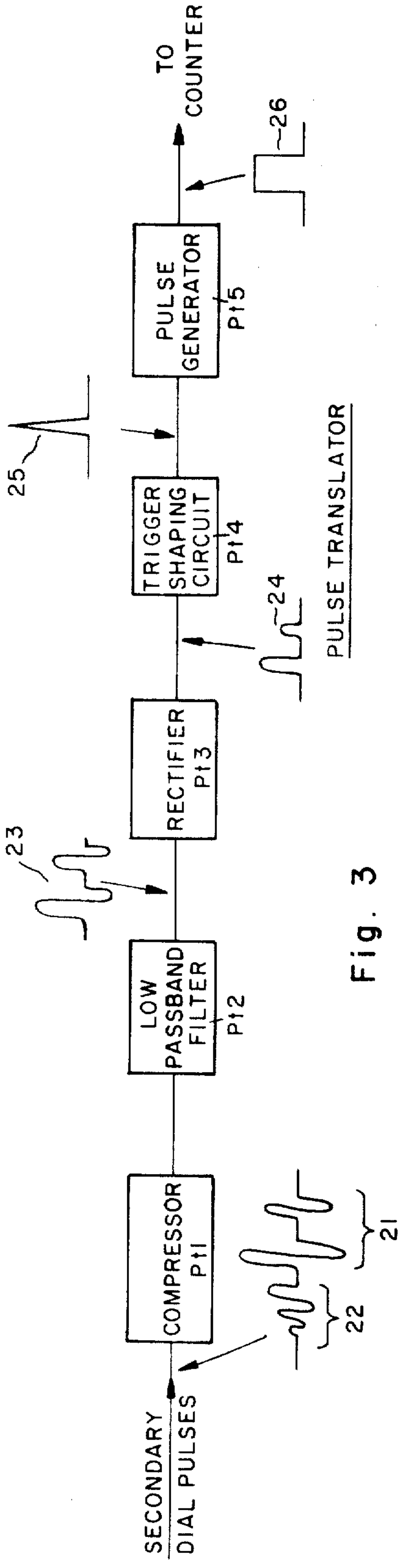
Figure 8:
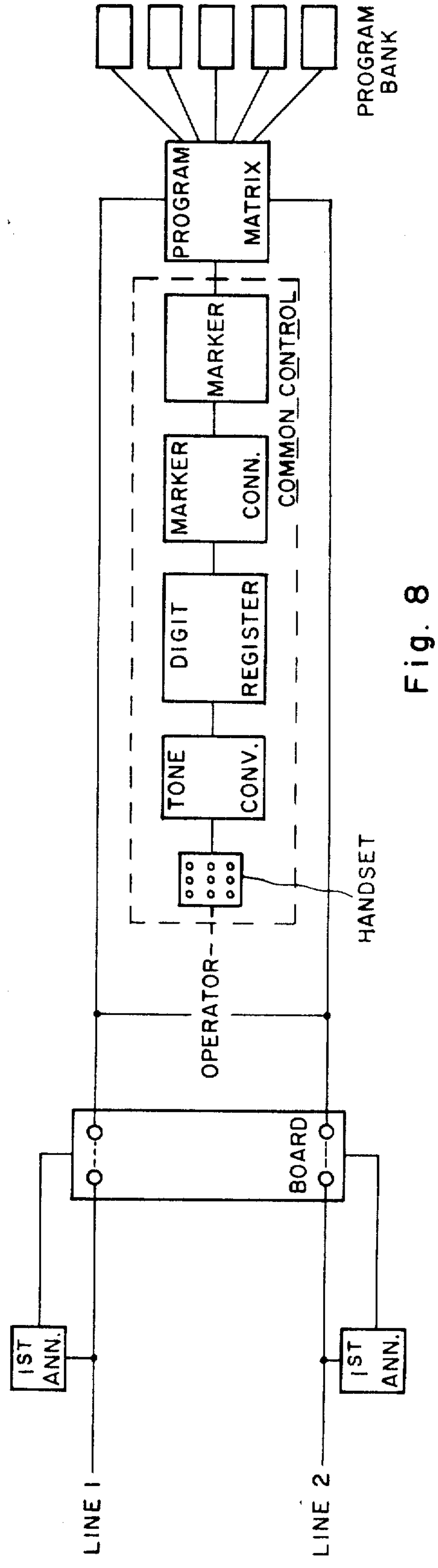
Figure 4:
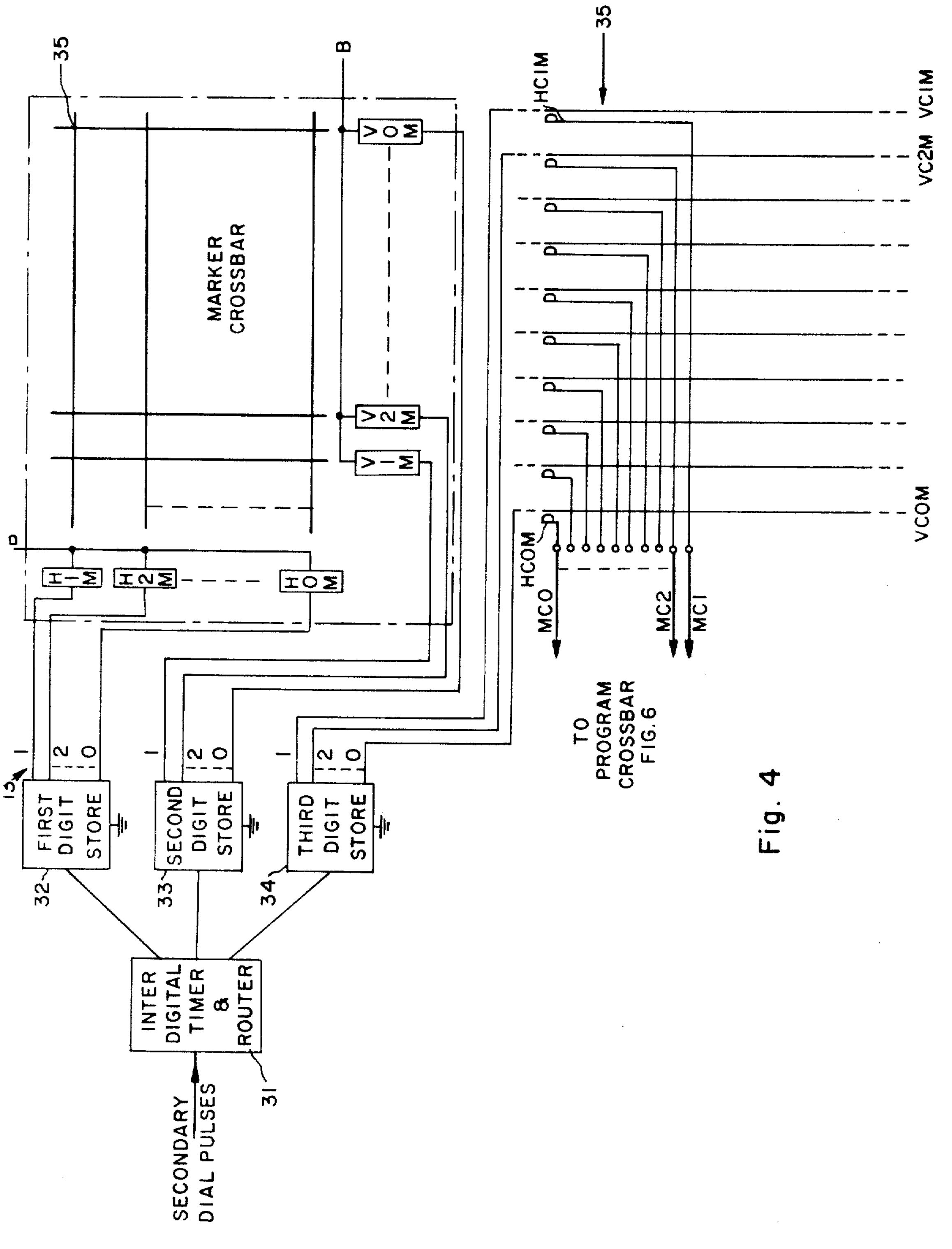
Figure 5:
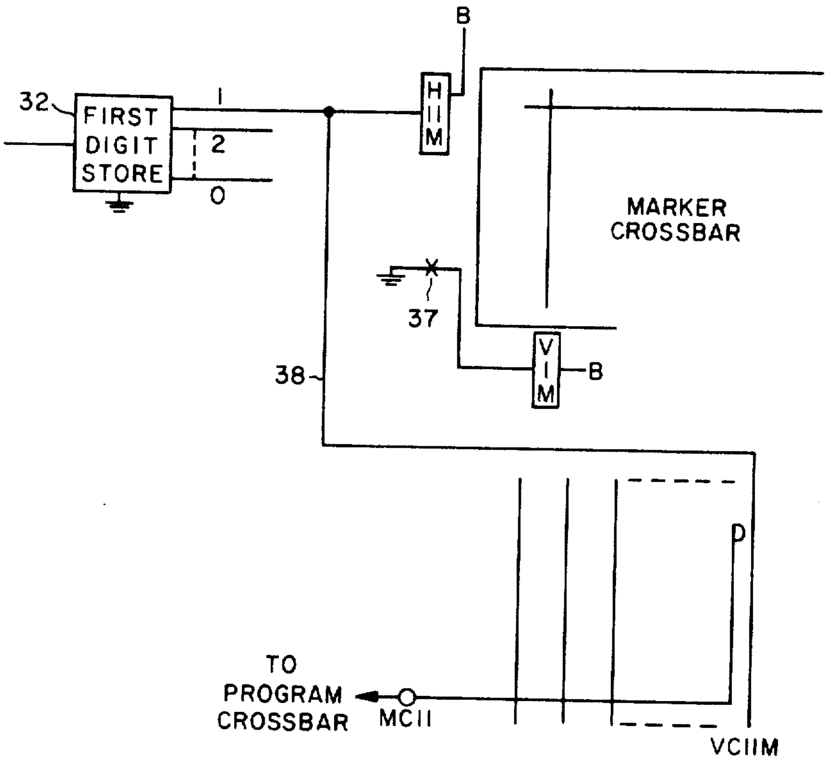
Figure 6:
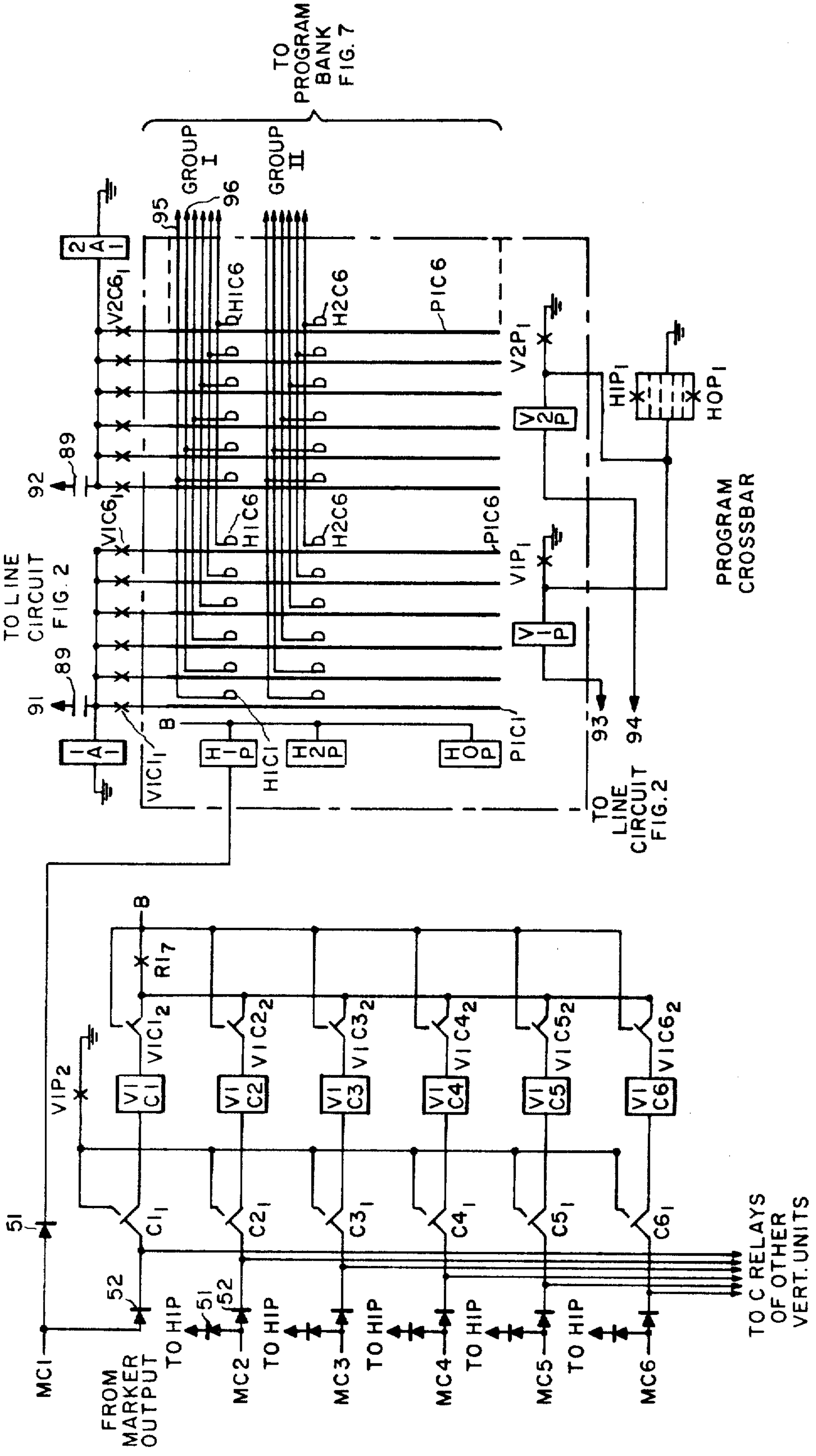
Figure 7:
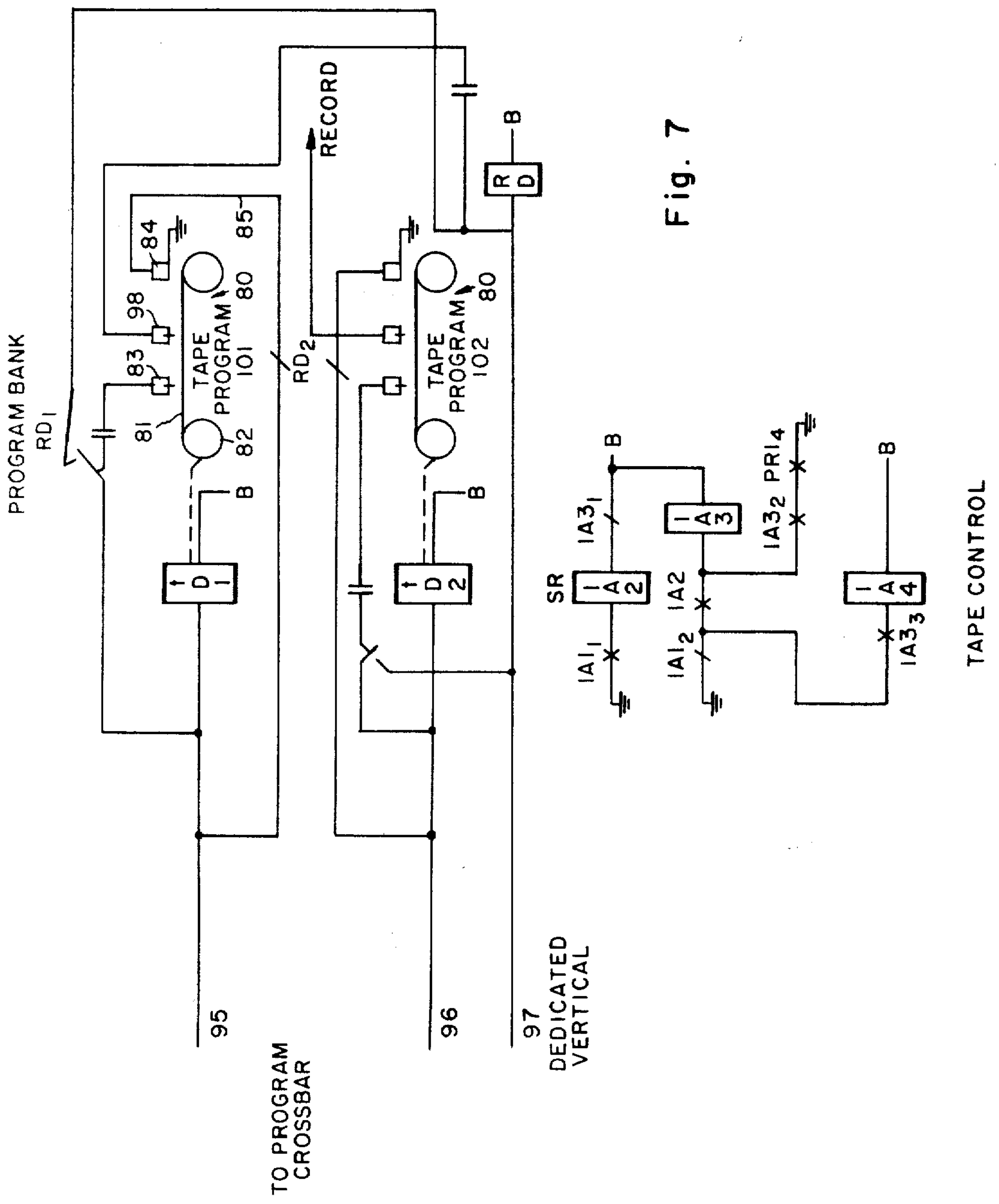

Further objects and features will become apparent upon consideration of the following description when read with reference to the accompanying drawing, wherein: FIG. 1 schematically illustrates by means of block diagrams one form of automatic apparatus or system in accordance with our invention; FIG. 2 schematically illustrates several line circuits for gaining access to to the common control equipment; FIG. 3 is a block diagram with associated waveforms showing operation of the pulse translator; FIG. 4 is a block, partially schematic diagram showing operation of parts of the register, marker connector and marker circuitry; FIG. 5 illustrates part of marker connector circuitry to handle a one-digit code; FIG. 6 is a block, partially schematic diagram showing operation of the program matrix; FIG. 7 is a block diagram showing the program source circuitry; FIG. 8 schematically illustrates by means of block diagrams one form of semiautomatic apparatus in accordance with the invention.

GENERAL DESCRIPTION

Before proceeding with the detailed description of the apparatus of the invention, some of the main functions are described with reference to the functional representation of the apparatus as shown in FIG. 1 for an automatic system employing secondary dialing (the term dialing is to be understood in a generic manner to cover both the act of dialing a conventional dial telephone to generate dial pulses, and of pushing buttons of a tone signal telephone to generate tones, except where the context indicates otherwise). The description that follows will be specific to the airline information application described above, though those skilled in this art will quickly recognize that it is applicable in any situation using public telephone lines or private telephone lines or radio links in place of or together with the lines to provide access by a plurality of individuals, who for convenience will be referred to as subscribers, to one of a plurality of recorded message units, which for convenience will be referred to as program sources, the assembly of sources being referred to as a program bank or library. In the form hereinafter described and reduced to practice, the program sources consisted of individual magnetic tape decks with replaceable endless tape cartridges which afford a flexible system allowing for easy change of the number of programs desired, but the invention is not limited to such program sources and any recording device which will record information and will respond to electrical signals to playback that information into a signal or telephone line can obviously be substituted. Also, the program sources need not be separated from one another as illustrated in the drawing but could obviously be combined into a single or multiple recorder mechanism having provision for playback in response to an electrical signal predetermined recorded segments thereof constituting a complete message unit. The invention is not in the specific form of the program sources but in the way of accessing them.

The automatic system functionally illustrated in FIG. 1 comprises a program bank with individual program sources PS101, PS102, PS103, PS104 and PS105 (corresponding to similarly numbered flight numbers) all connected to a program switching system illustrated as a matrix designated PC. In a preferred form, the matrix is a crossbar switch, and each of the program sources is terminated on one of the crosspoint contacts of a horizontal multiple wired crossbar. Also connected to the matrix PC are line circuits LC1 and LC2 which are connectable to the central office incoming telephone lines. When the matrix PC is a crossbar switch, the lines LC1 and LC2 preferably are each associated with a crossbar vertical. Each line LC1 or LC2 can access any program source once the proper crosspoint sets are closed and the proper vertical contact strips marked. The apparatus includes the usual devices for responding to ringing current to connect the incoming line to a first announcement recorder, e.g., a tape deck, which is actuated and the playback head via the usual amplifiers connected to the caller to acknowledge the called party, i.e., the airline, and announce to the caller the proper dialing procedure, for instance, that flight arrival and departure information is available if the caller will dial the flight number after receiving a suitable dial tone. After completing the announcement, the tape deck via a connection 6 informs a register connector RC of the incoming call. Since common control equipment is employed, each register group can process one call at a time, and the register connector provides circuitry to prevent more than one call at a time from being processed in each group. In a preferred form, it provides a gating and preference arrangement which operates as follows. The gate is normally open. Whichever call first reaches the end of the announcement will close the gate. Other simultaneous calls will be held up until the gate is reopened when the desired program source is connected and the common control dropped out. Upon closing of the gate, an audible tone is conveyed to the caller indicating that dialing can commence.

The dial pulses or tones are conveyed first to a discriminator 8 to separate them. If dial pulses, it will be appreciated that they do not have the standard DC square wave of a normal dial pulse before a connection is made but instead exhibit an AC waveform which, in order to employ standard register equipment, must first be converted to a DC square wave, which takes place in a pulse translator PT. The pulse translator also functions to discriminate against noise on the line which might be mistaken for the secondary dial pulses. Next, the pulses are counted in a counter 10 and stored in a digit register 11. The tones are processed by a tone converter 12 and converted to decimal markings also stored in the register 11.

When the register recognizes a proper code, it is connected via a marker connector 13 to a marker. If the code is assigned to a program, the marker electrically actuates the matrix PC to connect the calling line to the desired program source. Once the matrix is actuated, the common control equipment is restored to idle form and available for the next call. If the code is unassigned, the marker connector 13 will inform the register 11 informing via a line 15 a manual operator 16 who can connect into the calling line to supply assistance. When the program source completes the delivery of the information, determined by two end-of-message signals, the matrix PC is released and the connection opened and the call terminated. If another line arriving at a later time has been accessing the same program source, the source will continue to deliver the requested information in response to the second call even though the connection to the first call is broken.

While the illustrated system for simplicity shows only two incoming lines, it will be recognized that it can easily accommodate many more lines depending on the traffic expected. Similarly, while only five program sources are shown, hundreds of additional sources are readily added to the system as required. In a typical preferred system, a common register connector with the intervening equipment up to and including the digit register is provided for each group of, for example, depending on the traffic, five line circuits, and the remaining common control equipment which includes the marker connector and marker is capable of handling four such line groups or up to 20 line circuits. Using a commercially available crossbar switch for the program matrix, a total of 60 programs can be made available to any of the lines. Adding additional crossbar switches in parallel increases the capacity accordingly. For instance, 20 parallel-connected program crossbars will provide over 1,100 programs to 20 incoming lines.

Also illustrated in FIG. 1 is an extra dedicated line LC10 available only to airline personnel and connected to the matrix PC to enable said personnel to modify as desired the information recorded on each program source in the bank. As will be obvious, provision can also be made to use an existing line through coded dialing to gain access to a particular program to change its content. As another alternative, the tape cartridges can be physically removed from their decks, modified announcements recorded thereon in a separate conventional recorder, and the cartridges reinserted, or the old tapes simply replaced with new tapes.

LINE CIRCUIT - REGISTER CONNECTOR

FIG. 2 illustrates one of various known circuit techniques for providing access sequentially by the incoming lines to the common control equipment. Many details of the circuit which are nonessential to the invention and which those skilled in this art will fully appreciate have been omitted. Only two circuits have been illustrated to show the principle of the preference arrangement, but the same principle will of course allow many lines, depending on the traffic, to be serviced by the common control equipment described.

Each line circuit has its own first announcement equipment comprising a tape deck 70, an endless tape 71 on which is recorded the acknowledgment and dialing instructions, a drive motor 72, and a playback head 73. When ringing current on the line LC1 is coupled through a capacitor 74 and operates relay RR1, the line is seized by contact $RR1_1$ or other mediate relays if desired, and contact $RR1_2$ starts the tape drive motor 72 conveying the message on the tape 71 to the caller. A holding circuit consisting of a drive motor relay (not shown) contact T1 and normally closed contact $R1_4$ keeps the drive motor operated. When the tape reaches the end of the message, and end-of-tape signal, usually ground, is generated in a known manner (conventional electrical means may be employed) shown schematically at 75 to operate end-of-tape relay ET1 whose contacts $ET1_1$ are in a preference chain circuit including a register seizure relay RS1. There is one register seizure relay RS provided for several incoming lines, e.g., one for each five incoming lines. Operation of RS1 does the following. Contact $RS1_1$ applies battery to a chain of register relays R1— R2 each in series with its own end-of-tape relay contact $ET1_2$—$ET2_2$. The first end-of-tape relay to operate thus causes the first register relay R1 in the chain to operate. Each register relay is associated with a particular line circuit; thus R1 with LC1. When R1 operates, a first transfer contact $R1_1$ applies battery to relay R1 as a holding circuit while simultaneously removing battery, together with contact $R1_8$, from the other holding circuits in the chain. Then a second contact $R1_2$ opens releasing the register seizure relay RS1. However, R1 remains energized. Another contact $R1_3$ releases the end-of-tape relay ET1, another contact $R1_4$ stops the tape deck drive 72, and contacts $R1_5$ connects the line LC1 to the dial tone generator and tone-pulse discriminator 8 (see FIG. 1). When the line is connected, contact $R1_6$ releases the first announcement playback head 73. During operation of the marker and program crossbars, a program relay PR1 associated with its program vertical in a program crossbar is energized and its contacts $PR1_1$ extends the line LC1 via a transformer 76 to the program matrix, while another contact $PR1_2$ releases the register relay R1, which then terminates the connection to the common control equipment. When relay R1 is released, its contact $R1_2$ closes rendering the register seizure relay RS1 available for line LC2 or any of the other lines. This simple arrangement illustrated in FIG. 2 thus allows each subscriber to be handled independently and simultaneously by its own first announcement equipment, after which each line must wait its turn to the common control equipment, which is indicated by dial tone on the caller's line when all of the register relays R except that associated with the calling line are released. In a typical system, it will take about 15—20 seconds from the time a line is seized until the end-of-tape signal, and only about 5—7 seconds for the common control equipment to connect the seized line to the selected program.

After dial tone is placed on the line in a conventional manner, the subscriber dials the code associated with the selected program, for instance, a flight number. To enable the system to respond to both tones and pulses, conventional telephone equipment is employed as illustrated merely in block diagram in FIG. 1 to discriminate pulses from tones in a discriminator 8, route the tones to a conventional converter 12 which converts them to the usual digit code to operate a conventional digit register 11 to store the digits corresponding to the tones signalled by the subscriber. When dial pulses are generated by the subscriber, they are processed in a pulse translator PT. As will be evident to those skilled in this art, the discriminator 8 and tone converter 12 are conventional and need not be described further.

PULSE TRANSLATOR

As mentioned above, the secondary dial pulses do not exhibit the usual DC rectangular pulses one normally obtains from a dial telephone. Since the secondary dialed pulses are generated while the line is connected with the intervening equipment, including capacitors, loading coils and transformers, the pulse shape is converted to an AC oscillation, generally followed by a smaller induced replica, whose main frequency components are in the low frequency range. Such a pulse is shown at 21 in FIG. 3. In front of it is shown, schematically, at 22 a voice frequency talking signal, which is usually of lower amplitude. The circuit shown in block diagram in FIG. 3 enables the desired dial pulse to be separated from any voice signals or other noise on the line and restored to their normal rectangular appearance and width in order to employ in the following circuits standard telephone type register equipment which is designed to respond to the normal telephone dial pulses.

The first circuit in the pulse restoring chain illustrated in FIG. 3 is a standard compressor circuit PT1, which simply attenuates equally all incoming signals above a desired value to avoid overdriving of any of the subsequent stages and to maintain a favorable signal-to-noise ratio for long distance signals. Its presence is desired to enable the system to respond both to local calls and long distance calls, whose secondary dialed pulses would be of smaller amplitude compared with those dialed locally. In effect, the compressor circuit reduces the signal level to the value that would be expected from a long distance dialed signal. From the compressor the signal passes into a low frequency filter network PT2 of the conventional type having a narrow passband designed to pass only the frequency components concentrated in the secondary dial pulses. A suitable passband is, for example, 10—15 Hz. This filter eliminates practically all of the noise and any voice signals on the line. Next, the signal at the output shown at 23 is rectified PT3, illustrated at 24, amplified, and passed through a trigger or wave shaping circuit PT4 of standard type designed to create a sharp pulse of a desired amplitude from the leading edge of the two-pip signal shown at 24. The output of the shaping circuit is shown at 25, and constitutes a single sharp pulse for each dial pulse originating with the caller. The pulse now triggers on a monostable multivibrator PT5 whose output is thus a rectangular pulse with a width chosen to match the width of standard dial pulses, e.g., 50 milliseconds. The output, shown at 26, can then be processed in the normal way by conventional register equipment, which counts the pulses and stores the digits indicated for operation of the marker.

REGISTER

The register 11 is a standard piece of equipment, available commercially, which simply processes the secondary dial pulses or converted tones to ascertain the number of digits dialed and the actual digits themselves. As illustrated schematically in FIG. 4, the digits are timed in a standard way by an interdigital timer 31. The first digit is routed to the first digit store 32 which determines the first digit dialed, and after a suitable hold period then routed to the second digit store 33 which determines the second digit dialed, and again after a suitable hold period to the third digit store 34 which determines the third digit dialed. The stored digits energize selected relays (not shown) in a conventional manner in the marker connector 13 in accordance with their values. The marker connector is also a conventional piece of equipment. Thus each energized relay, or two or more relays if a different counting system is used, is representative of one of the digits dialed. Each digit store has 10 outputs (for the 10 possible digits), but only one of those outputs is marked e.g., grounded) depending upon the value of the digit dialed.

MARKER

For the three-digit example given, the operation continues as follows. The contacts of the relay closed by the first digit extend ground to an associated horizontal select magnet H1M-HOM of the marker crossbar, the other side of the magnet coil being connected to battery. The contacts of the relay closed by the second digit extend ground to an associated vertical hold magnet V1M-VOM of the marker crossbar, the other side of the magnet coil being connected to battery, thus closing one set of crosspoints in that vertical unit. The contacts of the relay closed by the third digit extend ground to one vertical contact strip of the vertical unit energized. In FIG. 4 is illustrated schematically a commercially available crossbar switch comprising five horizontal select bars and thus 10 horizontal channels, and 10 vertical hold assemblies. The enlarged schematic partial side view of a single vertical unit at the bottom shows a conventional construction employing 10 fixed vertical contact strips VC1M-VCOM with 10 movable horizontal contacts HC1M-VCOM constituting a crosspoint set for each of the horizontal channels. Such a switch has a capability of 10 ×10 ×10 = 1,000 crosspoints. Thus, through the use of a three-digit code as above described, a ground can be established on any one of 1,000 output contacts MC1-MC0 constituting the movable contacts of the crossbar. Each one of these outputs is associated with a particular program, and thus the stored digits have marked, with ground, one of the marker crossbar outputs MC1-MC0 constituting the desired program.

For example, if the subscriber has dialed 102 as the flight number, the first digit energizes the number 1 or top horizontal select magnet H1M. The second digit 0 energizes the number 0 or last vertical hold magnet VOM, closing the set of crosspoints designated 35 in FIG. 4, and the third digit 2 grounds the second vertical contact strip VC2M, and thus only the output MC2, of 1,000 possible outputs, has a ground connection. It will further be noted that all of the vertical contact strips of each vertical unit may be interconnected in parallel by a common bus, since they are all activated by the same third digit store. For example, all of the No. 2 vertical contact strips may be interconnected as they all connect to the 2-output of the third digit store. Of course, the only marked output is that of the closed crosspoint set. As a result, the connections necessary to the marker crossbar output are amazingly small, namely, common busses interconnecting, for instance, all of the number 1 vertical contact strips in each of the vertical units, all of the number 2 vertical contact strips in each of the vertical units, and so forth, plus a single line for each output for each program in the bank. The overall cost of such a selection system is therefore surprisingly low, while retaining good flexibility and high speed.

We have thus described the operation for a three-digit number. The system is sufficiently flexible to handle two-digit and one-digit numbers also, which is accomplished, if desired, by enlarging the marker crossbar to include additional horizontal channels. To handle one-digit and two-digit numbers thus requires a standard, commercially available, six horizontal select bar crossbar switch, providing 12 horizontal channels, which also increases the program capacity to 1,110. The manner for handling the smaller digit codes is as follows, taken in connection with FIG. 5.

For a one-digit secondary dialed code, after the timing interval (2 —3 sec.) has elapsed with no further pulses, as in known telephone practice the interdigital timer 31 operates a relay (not shown) informing the register to process this digit as a one-digit call, in which case the horizontal select magnet of an additional dedicated horizontal channel, designated H11M in FIG. 5, is activated. A set of contacts 37 from the standard off normal horizontal pileup present in these standard crossbar switches, normally open but now closed, is then used to extend ground to and energize any one of the vertical hold magnets, shown as the first vertical unit in the FIG. Simultaneously, the digit stored in the first digit store 32 has extended ground via a connection 38 to one of the vertical contact strips VC11M in the vertical unit energized. For example, if the digit dialed is 1, the first contact strip VC11M is marked, thereby extending the ground through the closed crosspoints to a particular output terminal MC11.

By similar arrangements, as will be obvious, a two-digit secondary dialing can be processed using a second additional dedicated horizontal channel. In the latter case, the first stored digit selects the second dedicated horizontal channel by energizing its select magnet, and one of the 10 vertical units associated with the same first digit in the first store is energized in the same manner as with a three-digit number, and the register storing the second digit now selects an associated vertical contact strip in the energized vertical unit as was done in the case of a one-digit number. Thus, with a 12-horizontal channel, 10-vertical unit crossbar are of standard construction, responsive to one-digit, two-digit, and three-digit codes, a total of $(1\times10=10)+(10\times10=100)+(10\times100=1{,}000)=1{,}110$ marker outputs or available recordings are afforded.

Obviously various standard techniques can be employed to enable the system to respond to four or more coded digits using well-known digit absorbing circuitry techniques.

It will also be appreciated that the terminal marked by for instance the one-digit number could be used to flash an operator in a standard way to obtain more information. In such a case, for example, the first announcement will advise the subscriber that if they do not know their flight number, they should dial 0, which could bring a live operator 16 into the line who could supply the flight information desired and allow the subscriber to dial it directly, or the operator herself through her own telephone hand set (not shown) can dial the code corresponding to the flight number through the line circuit, as shown schematically in FIG. 1 at 40, and then into the register to effect the desired connection. The manner for doing this is not shown as those skilled in this art will readily be able to accomplish same using standard techniques.

PROGRAM MATRIX

The output of the marker is then coupled to the program matrix PC, a second crossbar switch, or a multiple group of crossbar switches depending upon the number of lines to be serviced and the number of programs to be made available. The output from the marker representing ground extensions is first applied through an isolation diode 51 to a particular horizontal channel or horizontal select magnet H1P-H0P of the program crossbar, which is associated with a group of programs. The same marker output is also applied via another isolating diode 52 to a selected one of a group of six vertical auxiliary column relays V1C1-V1C6 associated with each line circuit. A contact set $V1C1_1$-$V1C6_1$ of each of the column relays is connected to a vertical contact strip P1C1-P1C6 in each vertical unit in series with an isolating capacitor 89 and the secondary of the transformer 76, one side of which is grounded, in the line circuit, i.e., LC1. FIG. 6 illustrates a suitable arrangement employing a commercially available crossbar switch employing 10 horizontal channels and 20 vertical units each containing six vertical contact strips. The crossbar as illustrated is arranged in a horizontal multiple arrangement with the movable contacts H1C1-H1C6 of each vertical unit connected in parallel. Thus, the movable contact H1C1 for the first vertical contact strip in the first vertical unit is connected to the movable contact H1C1 for the first vertical contact strip in the second vertical unit, and so forth. Each vertical unit thus provides at each crosspoint set at one horizontal select position six outputs constituting one program group, which are the same for all vertical units. Hence, for 10 horizontal channels, a total of $10\times6=60$ program outputs are available. Each line circuit is associated with one vertical unit and thus 20 vertical units provides service to 20 line circuits that can now access 60 programs simultaneously. Twenty vertical units also require $6\times20=120$ auxiliary relays. The vertical auxiliary relays serve to select for its associated line circuit one output of each closed crosspoint set, or one program of each group of six.

As mentioned earlier in the description of the line circuit, relay R1 is energized when the register is seized, thus rendering the then-calling line circuit LC1 the only subscriber's call being processed. When the marker output, e.g., MC1, becomes available, the selected horizontal select magnet H1P is energized. The same marker output MC1 is applied through diode 52 to the column relay selection circuit which includes in parallel all C1 relays for all vertical units, only one of which V1C1, is shown at the left side of FIG. 6. Since the only relay operated is R1, only its contact $R1_7$ is closed and thus the only C1 relay to operate is that associated with the line circuit's call being processed, namely, V1C1. Referring back now to FIG. 2, a contact set $V1C1_3$ closes the circuit to a program relay PR1. Its contacts $PR1_3$ extends battery via terminal 93 to the hold magnet (FIG. 6) V1P for the first vertical unit, the other side of which is grounded through a set of parallel contacts $H1P_1$ from the horizontal off normal pileup. Since $H1P_1$ was closed when the horizontal select magnet H1P was operated, the hold magnet V1P operates, closing a contact set $V1P_1$ of its off normal pileup as a holding circuit. Another off normal pileup contact $V1P_2$ closes a holding circuit for the column relays V1C1-V1C6. Returning for the moment to FIG. 2, operation of program relay PR1 opens its contacts $PR1_2$ releasing the register relay R1 making available the register for the next call. Continuing with FIG. 6, operation of relay V1C1 also removes battery via transfer contact $V1C1_2$ from all the other C relays associated with the first vertical unit or LC1. This prevents a next marker output at, for instance, MC2 from operating the C2 relay associated with the first vertical unit, because another marker output while LC1 is occupied must be on a different line. Similarly, while V1C1 is operated, if MC1 is marked again then it can only function to operate one of the other C1 relays associated with the new calling line as transfer contact $C1_1$ associated with operated relay V1C1 has isolated the latter from the marker. To summarize, the vertical column relays C1—C6 function to select one of the six programs associated with each closed crosspoint set, to isolate battery from all the C relays associated with the calling line but the single operated C relay associated with the selected marker output, and to lock the operated C relay through the vertical off normal pileup.

Connected to the vertical contact strips P1C1 to P1C6 is a control A1 relay connected to ground. Thus the selected crosspoint movable contact H1C1 via terminal 95 extends ground to the program bank to program recorder 101 (FIG. 7), as desired. A one-wire system is described for operating the selected program recorder. When the one wire is marked, i.e., grounded, suitable relays are activated to start the recorder and the voice signals are conveyed back through the same wire 95 through the program crossbar switch and through the associated auxiliary relay contact $V1C1_1$ via terminal 91 to the calling line. It will also be evident that the closing of any other vertical unit, for example, No. 2, gives access by line circuit 2 to any of the 60 programs, including the same program 101 being accessed by line circuit 1.

To increase the program capacity, it is merely necessary to add additional program crossbar switches. For instance, for 120 programs, two program crossbars are necessary, with the vertical units wired in parallel. Thus, line circuit 1 is wired to the first vertical unit of both crossbars, line circuit 2 to the second vertical unit of both crossbars, and so forth. Providing 10 program crossbars gives access to 600 programs for 20 line circuits. In general, adding more vertical units enables the system to service more line circuits, and adding more horizontal channels increases the program capacity.

PROGRAM BANK

As mentioned earlier, in a preferred arrangement, illustrated in FIG. 7, each program source comprises a tape deck 80 with an endless tape cartridge 81 on which the desired program information is recorded. It includes a start motor 82, a playback head 83 coupled to the same output for conveying the recorded information back to the program crossbar, and a device 84 for generating an end-of-message signal to control the deck operation. As is conventional with these automatic tape decks, the end-of-message signal is a conductive portion on the tape which establishes ground for a short time interval while the conductive portion moves through the tape deck. This is used to provide at least one full message, but not to exceed two, for each subscriber as follows. Referring now to FIG. 7, connected to program output 95 is battery through a tape deck relay TD1. When the crosspoints close, battery operates relay TD1 starting the tape program and also operates relay 1A1 (FIG. 6), whose contact $1A1_1$ (FIG. 7) closes and operates a slow-release relay 1A2. When ground is applied via line 85 by the conductive tape end after the message has been played back once, battery is shunted from relay 1A1 releasing it, and its contact $1A1_2$ closes operating relay 1A3, whose contact $1A3_1$ releases relay 1A2, by which time the shunt had terminated reoperating relay 1A1. The release time of the A2 relay is chosen longer than the operate time of the shunt. Closed contact $1A3_2$ is the locking path for the A3 relay. After the message has repeated a second time and relay 1A1 is shunted the second time, releasing it, this time closing contact $1A1_2$ operates relay 1A4 via the operated $1A3_3$. A contact $1A4_1$ in series with the program relay (FIG. 2) releases the latter, and its contact $PR1_4$ then releases relay 1A3 which restores all the A relays to their normal position. When the program relay releases, then its contacts $PR1_1$ open releasing the line LC1 which terminates the call. Opening of contacts $PR1_3$ also releases the hold magnet V1P releasing the program crossbar.

Thus, the A relays, four of which are provided for each line circuit, operate to permit each subscriber to receive the taped program at least one full time before the call is terminated, as it requires two end-of-message signals before the A4 relay is operated which releases the line.

Recording of new or modified messages onto the program sources is carried out in an analogous manner by providing an additional vertical unit in the program crossbar exclusively for recording, i.e., a dedicated vertical associated with the dedicated line LC10 (FIG. 1). In this case, the dedicated line will be available solely to airline personnel and will contain preferably a tone signalling telephone, and have its line circuits connected into the register in the same manner as the subscriber's lines, except that, not needing first announcement equipment, the telephone would be provided with a manual switch (not shown) closing a contact corresponding to $ET1_1$ in the preference chain (FIG. 2) of the register connector circuit, with said manual contact having preference over the other lines. Once dial tone is received, the operator dials the flight number which in the same manner as hereinabove described connects his line through the dedicated vertical to the desired program source, with the main difference being that the connection is not made to the playback head 83 but to a recording head 98. This is achieved, as illustrated in FIG. 7, by connecting the program crossbar output 97 of the dedicated vertical unit to a recording deck relay RD associated with each program source. When ground is extended by the closing of a selected crosspoint set, operation of the recording deck relay RD does the following. It starts the tape deck drive motor 82 by a contact not shown, and simultaneously via transfer contact $RD_1$ connects the dedicated line LC10 through the program crossbar to any other calling lines connected to the same program 101. Another contact $RD_2$ opens the end-of-message circuit to disable same. Now, when the operator voices the new message for recording via recording head 98 onto the tape 81 (the old message being simultaneously erased by means not shown), all subscribers connected to the same program source will simultaneously hear the full message live from the operator, thus avoiding any delay in conveying the message to the subscribers. When the message is completed, the operator manually operates the switch previously mentioned which releases the vertical hold magnet of the dedicated vertical terminating the recording operation. The subscribers, depending on whether their A3 relay has been operated, may now receive the recorded message one more time.

It will be appreciated by those skilled in this art that many details well known in the art have been omitted as unnecessary to an understanding of our invention. For instance, in some cases, intermediate relays and holding circuits have been omitted but their use will be self-evident. Similarly, the signals picked up by a playback head in a tape recorder generally require preamplification before they become audible. Such preamplifiers are either built into the recorder or can be inserted in the playback head line wherever needed. Also, sometimes power amplifiers are required to provide additional amplification for any audio signals generated which again is readily available commercially and can be inserted wherever necessary.

It will further be observed that relay coils have been symbolized in the drawing as a small box identified by a letter or number and the associated contacts designated wherever possible by the same letter or number. The meaning of the contact illustrations has been depicted in a legend table in FIG. 2 to avoid the use of redundant descriptive matter. Thus, all contacts illustrated by an X are normally open, single-pole, single-throw, and all contacts illustrated by / are normally closed, single-pole, single-throw. Transfer relay contacts, all single-pole, double-throw, are illustrated as shown in the legend with the movable arm or contact always in the nonoperated or released position.

SEMIAUTOMATIC SYSTEM

The semiautomatic system illustrated in FIG. 8 is quite similar to the automatic system previously described, except as follows. Similarly to the automatic system, on ringing current being received, the first announcement tape deck is automatically connected to the caller to acknowledge the call and advise the caller to hold until an operator is available. Upon completion of the announcement, the board is flashed and an idle operator connects into the line and asks for the flight number. The caller states the flight number and the operator punches the numbers into her tone signal phone as part of a common control system to connect in the manner hereinbefore described the calling line automatically through the program matrix to the program bank, whereupon the common control and operator drop out and are available for the next call. This system will enable a single operator to process at least several times the number of calls processed by an operator in the prior art manual system. The system components in this arrangement are essentially alike to their counterparts in the automatic system, and those skilled in this art will readily be able to construct a semiautomatic system as depicted in FIG. 8 without the need for supplying additional details thereof herein.

It is understood that the above-described arrangements are merely illustrative of the application of the principles of this invention, which has widespread ramifications far beyond the airline application. For instance, it may be used to provide medical subscribers with recordings of symptoms of particular diseases upon the medical practitioner dialing a number, and on receiving the acknowledgment dialing coded digits assigned to the particular disease. Other uses of the system will be evident to those of this art. Numerous other arrangements may also be devised by those skilled in this art without departing from the spirit and scope of the invention. For example, secondary dialing of special one-digit codes stated in the acknowledgment can be routed to a general information recording (when for example all departing and arriving flights are on-time or interrupted) or to a manual operator position for assistance. Other terminations may be provided in standard ways for traffic metering, trouble indication, or supervisory circuits. Via the manual trunk from each line circuit, the call may be reterminated via the common control at a particular program source. This flexibility of the system is an important aspect of the invention.

We claim:

1. In an information retrieval system, a plurality of repeatable program sources containing information, signalling means operative to transmit signals representative of code digits each associated with one of the program sources, a plurality of calling line circuits, a program switching arrangement connected to the program sources and connectable to the calling line circuits and providing, when suitably actuated, connections between any of the program sources with any or all of the calling line circuits, control means common to all the calling line circuits and operative in accordance with the transmitted signals to terminate any one of the line circuits on the program switching arrangement and to actuate the switching arrangement connecting said one line circuit to the selected program source associated with the code digits signalled and then rendered idle and available to effect subsequent connections upon subsequent actuation of the signalling means, means associated with said one line circuit and operable upon connection to the selected program source to start the program source, means operative upon running of the program source to continue same for a selected period of time until the complete information contained therein is transmitted along said one line circuit and then in response to signals from the program source to release the switching arrangement and disconnect said one line circuit and stop the program source if no other line circuit is accessing the same program source, said common control means being operable upon subsequent transmission of the same signals to terminate another line circuit on the program switching arrangement and to actuate the program switching arrangement connecting said other line circuit to the same selected program source while the latter is being accessed by said one line circuit, and means associated with said other line circuit and operable upon connection to the selected program source to continue the operation of the said program source for a further period of time until the complete information contained therein is also transmitted along said other line circuit and then in response to signals from the program source to disconnect said other line circuit and stop the selected program source unless still another line circuit becomes connected to the same program source.

2. An information retrieval system as set forth in claim 1 wherein the signalling means are connected to the calling line circuit and are operated by the caller.

3. An information retrieval system as set forth in claim 1 wherein the signalling means are coupled to the control means and are operated by a call receiving operator.

4. In an information retrieval system, a plurality of repeatable program sources containing information, signalling means operative to transmit signals representative of code digits each associated with one of the program sources, a plurality of calling line circuits, a switchboard having inputs connected to the line circuits and having outputs, a crossbar switching arrangement connected to the program sources and connectable to the switchboard outputs and providing, when suitably actuated, connections between any of the program sources with any or all of the calling line circuits, marker means connected to the signalling means and operative in accordance with the transmitted signals to terminate any one of the switchboard outputs on the crossbar switching arrangement and to actuate the switching arrangement connecting said one switchboard output to the selected program source associated with the code digits signalled and then rendered idle and available to effect subsequent connections upon subsequent actuation of the signalling means, means associated with said one switchboard output and operable upon connection to the selected program source to start the program source, means operative upon running of the program source to continue same for a selected period of time until the complete information contained therein is transmitted to said one switchboard output and then in response to signals from the program source to release the switching arrangement and disconnect said one switchboard output and stop the program source if no other line circuit is accessing the same program source, said marker means being operable upon subsequent transmission of the same signals to terminate another switchboard output on the crossbar switching arrangement and to actuate the crossbar switching arrangement connecting said other switchboard output to the same selected program source while the latter is being accessed by said one line circuit, means associated with said other switchboard output and operable upon connection to the selected program source to continue the operation of the said program source for a further period of time until the complete information contained therein is also transmitted to said other switchboard output and then in response to signals from the program source to disconnect said other switchboard output and stop the selected program source unless still another switchboard output becomes connected to the same program source, and manual means for interconnecting switchboard outputs and inputs.

5. A semiautomatic information retrieval system as set forth in claim 4 wherein the market means includes a crossbar switch having plural horizontal channels and plural vertical units whose intersections form crosspoint sets, each vertical unit comprising plural vertical contact strips each associated with a movable horizontal contact constituting the marker outputs, and further having select magnets for operating each horizontal channel and hold magnets for operating each vertical unit, means responsive to the first signalled digit to operate a select magnet associated with said first digit, means responsive to the second signalled digit to operate a hold magnet associated with said second digit, means responsive to a third signalled digit to mark one of the vertical contact strips associated with the third digit in the selected vertical unit thereby extending the marking to the movable contact output associated with the selected vertical strip, and means including said switching arrangement and responsive only to a particular movable contact output for connecting the program source to the switchboard output.

6. A semiautomatic information retrieval system as set forth in claim 5 wherein the switching arrangement comprises a crossbar switch having plural horizontal channels and plural vertical units whose intersections form crosspoint sets, each vertical unit comprising plural vertical contact strips each associated with a movable horizontal contact, and further having a select magnet for operating each horizontal channel and a hold magnet for operating each vertical unit, means for coupling each switchboard output to a hold magnet for one of the vertical units and to the vertical contact strips of said one vertical unit, means for coupling the marker output to a select magnet for one of the horizontal channels and to one of the vertical contact strips of said one vertical unit, and means for connecting each program source to a different horizontal movable contact.

7. In an information retrieval system, a plurality of repeatable program sources containing information, a plurality of calling line circuits, signalling means associated with each of the calling line circuits and operative to transmit signals representative of code digits each associated with one of the program sources, a program switching arrangement connected to the program sources and connectable to the calling line circuits and providing, when suitably actuated, connections between any of the program sources with any or all of the calling line circuits, marker means common to all the calling line circuits and operative in accordance with the transmitted signals to terminate any one of the line circuits on the program switching arrangement and to actuate the switching arrangement connecting said one line circuit to the selected program source associated with the code digits signalled and then rendered idle and available to effect subsequent connections upon subsequent actuation of the signalling means, means associated with said one line circuit and operable upon connection to the selected program source to start the program source, means operative upon running of the program source to continue same for a selected period of time until the complete information contained therein is transmitted along said one line circuit and then in response to signals from the program source to release the switching arrangement and disconnect said one line circuit and stop the program source if no other line circuit is accessing the same program source, said common market means being operable upon subsequent transmission of the same signals to terminate another line circuit on the program switching arrangement and to actuate the program switching arrangement connecting said other line circuit to the same selected program source while the latter is being accessed by said one line circuit, means associated with said other line circuit and operable upon connection to the selected program source to continue the operation of the said program source for a further period of time until the complete information contained therein is also transmitted along said other line circuit and then in response to signals from the program source to disconnect said other line circuit and stop the selected program source unless still another line circuit becomes connected to the same program source, and means for automatically connecting any calling line circuit to the marker when idle.

8. The invention of claim 7 wherein the program sources comprise tape recorders having means responsive to operation of the switching arrangement for starting the tape recorder, means for conveying the message on the tape to the calling line circuit via the switching arrangement, and means for maintaining the program source connection to each calling line after being connected for at least one full playback of the program but for not more than two full playbacks.

9. The invention of claim 8 wherein the recorder includes means on the tape for generating a signal at the end of the recorded message, and means are provided associated with each line circuit and responsive to at least two end-of-message signals for releasing the switching arrangement and disconnecting the calling line.

10. The invention of claim 7 wherein the market means includes a crossbar switch having plural horizontal channels and plural vertical units whose intersections form crosspoint sets, each vertical unit comprising plural vertical contact strips each associated with a movable horizontal contact constituting the marker outputs, and further having select magnets for operating each horizontal channel and hold magnets for operating each vertical unit, means responsive to the first signalled digit to operate a select magnet associated with said first digit, means responsive to the second signalled digit to operate a hold magnet associated with said second digit, means responsive to a third signalled digit to mark one of the vertical contact strips associated with the third digit in the selected vertical strip, and means including said switching arrangement and responsive only to a particular movable contact output for connecting the program source to the calling line circuit.

11. The invention of claim 10 wherein the signal is a single digit code, means are provided responsive to the single digit to operate a select magnet associated with the single digit, to operate a hold magnet associated with the single digit, and to mark one of the vertical contact strips associated with the single digit.

12. The invention of claim 7 wherein the switching arrangement comprises a crossbar switch having plural horizontal channels and plural vertical units whose intersections form crosspoint sets, each vertical unit comprising plural vertical contact strips each associated with a movable horizontal contact, and further having a select magnet for operating each horizontal channel and a hold magnet for operating each vertical unit, means for coupling each calling line circuit to a hold magnet associated with said calling line circuit and to a vertical contact strip of said one vertical unit associated with the desired program, means for coupling the market output to a select magnet for one of the horizontal channels and to one of the vertical contact strips of said one vertical unit, and means for connecting each program source to a different horizontal movable contact.

13. The invention as claimed in claim 12 wherein means are provided to automatically acknowledge the call on each calling line and impart dialing instructions to the caller, means are provided for connecting the calling line to the marker when idle after acknowledgment, and means are provided for connecting the calling line to the program crossbar and then releasing the marker.

14. The invention as claimed in claim 13 and further comprising signal responsive means including a pulse translator for converting the received pulses into DC dial pulses and rejecting noise, said pulse translator including a compressor circuit, a low passband filter, a trigger shaping circuit producing a trigger waveform for each online dialed pulse, and a DC dial pulse generating circuit responsive to and actuated by the trigger waveform to produce one DC dial pulse for each trigger pulse.

15. The invention of claim 12 wherein corresponding vertical contact strips in all of the vertical units are interconnected to a common program source, and each of the vertical units is associated with one line circuit.

16. The invention of claim 15 wherein multiple program crossbar switches are provided with corresponding vertical units being connected in common to the same line circuit, and each horizontal channel of each crossbar switch being associated with a different group of program sources.

17. The invention of claim 15 wherein means are provided for sequentially connecting each line circuit to the same corresponding vertical contact strip in each associated vertical unit and thus to the same program source.

18. The invention of claim 15 wherein a group of auxiliary relays are provided associated with each vertical unit of the switching arrangement, the number of auxiliary relays in each group being equal to the number of vertical contact strips in each vertical unit, and the means for coupling the marker output also includes means for coupling the marker output to one of the relays in the auxiliary group which when operated marks the associated vertical contact strip.

19. The invention of claim 18 wherein corresponding relays of each auxiliary group are connected in parallel, and means are provided operative upon operation of the marked auxiliary relay to disable the remaining auxiliary relays in its group.